(12) United States Patent
Chiu et al.

(10) Patent No.: US 12,228,763 B2
(45) Date of Patent: Feb. 18, 2025

(54) SWITCHABLE BACKLIGHT MODULE

(71) Applicant: Darwin Precisions Corporation, Hsinchu County (TW)

(72) Inventors: Yu-Huan Chiu, Hsinchu County (TW); Chien-Wei Liao, Hsinchu County (TW); Yen-Lung Chen, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 18/223,750

(22) Filed: Jul. 19, 2023

(65) Prior Publication Data

US 2024/0126001 A1 Apr. 18, 2024

(30) Foreign Application Priority Data

Oct. 12, 2022 (TW) .................................. 111138654

(51) Int. Cl.
*F21V 8/00* (2006.01)

(52) U.S. Cl.
CPC ......... *G02B 6/0053* (2013.01); *G02B 6/0076* (2013.01)

(58) Field of Classification Search
CPC ........................... G02B 6/0053; G02B 6/0076
See application file for complete search history.

(56) References Cited

U.S. PATENT DOCUMENTS

| | | | |
|---|---|---|---|
| 10,705,283 B2 | 7/2020 | Liu | |
| 11,150,399 B2 | 10/2021 | Liao | |
| 11,982,831 B2 * | 5/2024 | Li | G02B 6/0076 |
| 2007/0139776 A1 * | 6/2007 | Meng | G02B 6/0053 359/529 |
| 2008/0112187 A1 | 5/2008 | Katsumata et al. | |

(Continued)

FOREIGN PATENT DOCUMENTS

| | | |
|---|---|---|
| CN | 211236517 U | 8/2020 |
| CN | 107179627 B | 10/2020 |

(Continued)

OTHER PUBLICATIONS

English Machine Translation of Li et al CN 112882286 (Year: 2024).*

(Continued)

*Primary Examiner* — Donald L Raleigh
(74) *Attorney, Agent, or Firm* — WPAT, PC (57) ABSTRACT

A switchable backlight module is disclosed. The switchable backlight module includes two light source modules arranged parallelly with respect to a plane. Each of the light source modules includes a turning film and a LGP. The LGP is of an edge-lit type arranged parallelly under the turning film. A light ray enters the LGP from a light incident side of the LGP, exits the LGP from a light emergent surface of the LGP, enters the turning film, and exits the turning film from a surface of the turning film away from the LGP. The light incident side of the LGP of one of the light source modules is perpendicular to the light incident side of the LGP of the other light source module. The switchable backlight module is in an anti-peeping mode having a narrow viewing angle when only an upper one of the light source modules emits light.

8 Claims, 10 Drawing Sheets

(56) References Cited

U.S. PATENT DOCUMENTS

| | | | | |
|---|---|---|---|---|
| 2017/0116930 A1* | 4/2017 | Johnson | ............ | G02F 1/133615 |
| 2023/0003932 A1* | 1/2023 | Lai | ....................... | G02B 6/0053 |
| 2023/0101373 A1* | 3/2023 | Kim | ..................... | G02B 6/0058 |
| | | | | 362/613 |

FOREIGN PATENT DOCUMENTS

| | | | | |
|---|---|---|---|---|
| CN | 112882286 A | * | 6/2021 | ........... G02B 6/0046 |
| TW | 201719622 A | | 6/2017 | |
| TW | M556333 U | | 3/2018 | |

OTHER PUBLICATIONS

TIPO has issued the Office Action for the corresponding Taiwan application on Aug. 11, 2023.

* cited by examiner

SWITCHABLE BACKLIGHT MODULE

CROSS-REFERENCE TO RELATED APPLICATION

This application claims the priority benefit of Taiwan application serial no. 111138654 filed on Oct. 12, 2022. The entirety of the above-mentioned patent applications is hereby incorporated by reference herein and made a part of this specification.

TECHNICAL FIELD

The present disclosure relates to a switchable backlight module. More specifically, the present disclosure relates to a backlight module capable of switching light emergent modes.

BACKGROUND

With the development of science and technology, consumer electronic products are thriving in the market. In this regard, mobile electronic products are the mainstream among the consumer electronic products, such as smart phones, notebook computers, tablet computers, vehicle computers, or engineering control computers. In addition to basic functions, these consumer electronic products may provide users with more and more powerful additional application functions. For example, in the case of a smart phone, in addition to providing basic call functions and information sending and receiving, the smart phone may further provide users with functions such as web browsing, movie watching, or word processing. However, when the above additional application functions involve confidential or private information, these consumer electronic products are inconvenient in use. In this regard, how to make electronic products keep information private while presenting pictures has become a hot topic in related fields.

In the conventional technology, it is common to narrow the viewing angle by adding an anti-peeping sheet, so as to achieve the anti-peeping effect. However, this method requires the placement/removal of an anti-peeping sheet to control presence or absence of the anti-peeping effect, which is inconvenient to use. On the one hand, the general anti-peeping sheet may affect display quality and brightness. In other words, in order to meet the brightness requirements, a light source needs to output power, which is unfavorable for energy consumption. In addition, optical films such as the anti-peeping sheet are made of expensive materials, which may also increase a thickness of a display module.

SUMMARY

An object of the present disclosure is to provide a switchable backlight module, which may be effectively switched to an anti-peeping mode or a non-anti-peeping mode.

Another object of the present disclosure is to provide a switchable backlight module with lower energy consumption and better economy.

A switchable backlight module of the present disclosure includes two light source modules arranged parallelly with respect to a plane. Each of the light source modules includes a turning film and a light guide plate (LGP). The LGP is of an edge-lit type and is arranged parallelly under the turning film, and has a light emergent surface facing the turning film and a light incident side at a side of the light emergent surface. A light ray enters the LGP from a light incident side of the LGP, exits the LGP from the light emergent surface, with more than 85% of light energy being concentrated between 70° and 90° with respect to a normal direction of the light emergent surface, then enters the turning film and is steered right, and exits the turning film from a surface of the turning film away from the LGP, with more than 80% of the light energy being concentrated between −30° and +30° with respect to left and right viewing angles relative to the normal direction of the light emergent surface, and the light incident side of the LGP of one of the light source modules is perpendicular to the light incident side of the LGP of the other light source module.

In this embodiment of the present disclosure, after the light ray of the upper first light source module is steered right, more than 50% of the light energy is concentrated between −10° and +10° with respect to the left and right viewing angles relative to the normal direction of the light emergent surface.

In this embodiment of the present disclosure, the switchable backlight module includes an upper first light source module and a lower second light source module. After a light ray exiting the second light source module passes through the first light source module, more than 80% of the light energy is distributed outside the range of −30° to +30° with respect to the left and right viewing angles relative to the normal direction of the light emergent surface.

In this embodiment of the present disclosure, the switchable backlight module further includes a plurality of light-emitting elements arranged on the light incident side of the LGP, and each of the light-emitting elements may emit a light ray that enters the LGP from the light incident side.

In this embodiment of the present disclosure, a plurality of prism strips extending in a direction parallel to the light incident side of the LGP are arranged on a surface of the turning film.

In this embodiment of the present disclosure, a plurality of microstructures are provided on a surface of the LGP away from the light emergent surface. The light ray entering the LGP from the light incident side of the LGP travels in a changed direction through the microstructures, and exits the LGP from the light emergent surface, with more than 85% of the light energy being concentrated between 70° and 90° with respect to the normal direction of the light emergent surface. The direction is a direction perpendicular to the LED light-emitting element.

In this embodiment of the present disclosure, a light emergent angle of one of the light source modules may be the same as or different from a light emergent angle of the other light source module.

In this embodiment of the present disclosure, the switchable backlight module further includes a reflective layer arranged under the light source modules.

In this embodiment of the present disclosure, the switchable backlight module further includes a first diffusion film arranged over the light source modules.

In this embodiment of the present disclosure, the switchable backlight module further includes a second diffusion film arranged between the light source modules.

BRIEF DESCRIPTION OF THE DRAWINGS

FIG. 6 to FIG. 7B show simulation results of a switchable backlight module according to the present disclosure.

DETAILED DESCRIPTION

Implementations of a connection assembly disclosed by the present disclosure are described below by using particular and specific embodiments with reference to the drawings, and a person skilled in the art may learn of advantages and effects of the present disclosure from the disclosure of this specification. However, the following disclosure is not intended to limit the protection scope of the present disclosure, and a person skilled in the art may carry out the present disclosure by using other different embodiments based on different viewpoints without departing from the concept and spirit of the present disclosure. In the accompanying drawings, plate thicknesses of layers, films, panels, regions, and the like are enlarged for clarity. Throughout the specification, same reference numerals indicate same elements. It should be understood that when an element such as a layer, film, region or substrate is referred to as being "on" or "connected" to another element, it may be directly on or connected to the another element, or intervening elements may also be present. In contrast, when an element is referred to as being "directly on" or "directly connected to" another element, there is no intervening element present. As used herein, "connection" may refer to a physical and/or electrical connection. Further, "electrical connecting" or "coupling" may indicate that another element exists between two elements.

It should be noted that the terms "first", "second", "third", and the like that are used in the present disclosure can be used for describing various elements, components, regions, layers and/or portions, but the elements, components, regions, layers and/or portions are not limited by the terms. The terms are merely used to distinguish one element, component, region, layer, or portion from another element, component, region, layer, or portion. Therefore, the "first element", "component", "region", "layer", or "portion" discussed below may be referred to as a second element, component, region, layer, or portion without departing from the teaching of this disclosure.

In addition, relative terms, such as "down" or "bottom" and "up" or "top", are used to describe a relationship between an element and another element, as shown in the figures. It should be understood that the relative terms are intended to include different orientations of a device in addition to orientations shown in the figures. For example, if a device in a figure is turned over, an element that is described to be on a "lower" side of another element is directed to be on an "upper" side another element. Therefore, the exemplary terms "down" may include orientations of "down" and "up" and depends on a particular orientation of an accompanying drawing. Similarly, if a device in a figure is turned over, an element that is described as an element "below" another element or an element "below" is directed to be "above" another element. Therefore, the exemplary terms "below" or "below" may include orientations of up and down.

As used herein, "about", "approximately", or "substantially" is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, ±20%, ±10%, ±5% of the stated value. Further, as used herein, "about", "approximately", or "substantially" may depend on optical properties, etch properties, or other properties to select a more acceptable range of deviations or standard deviations without one standard deviation for all properties.

Figure 1:
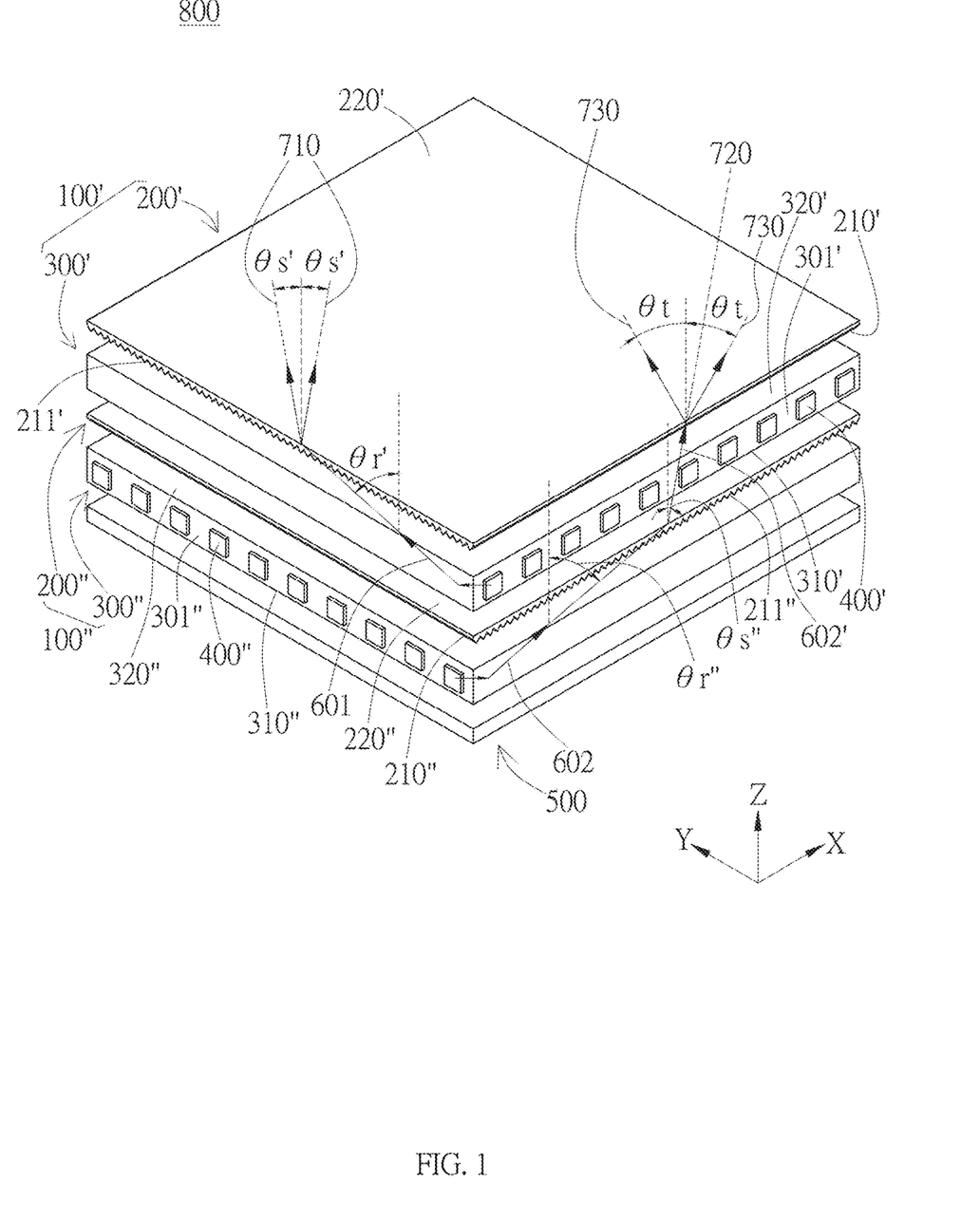
FIG. 1 is a schematic diagram of an embodiment of a switchable backlight module according to the present disclosure.

In an embodiment shown in FIG. 1, a switchable backlight module 800 of the present disclosure includes two light source modules 100' and 100" arranged parallelly with respect to an X-Y plane. However, in different embodiments, a number of light source modules may also be adjusted according to optical design requirements. In this embodiment, projections of the light source modules 100' and 100" may at least partially or completely overlap on a virtual X-Y plane. With respect to the overall light emergent direction (that is, a positive Z direction), the first light source module 100' is located at a front end, and the second light source module 100" is located at a back end. Each light source module includes a turning film and a light guide plate (LGP). For example, the first light source module 100' includes a first turning film 200' and a first LGP 300', and the second light source module 100" includes a second turning film 200" and a second LGP 300". The first LGP 300' and the second LGP 300" are each of an edge-lit type, and are respectively arranged parallelly under the first turning film 200' and the second turning film 200". A light incident side 301' of the first LGP 300' of the light source module 100' is located at a side of a light emergent surface 320' of the first LGP, and a light incident side 301" of the second LGP 300" of the second light source module 100" is located at a side of a light emergent surface 320" of the second LGP. As shown in FIG. 1, the light incident side 301' of the first LGP 300' of the light source module 100' is perpendicular to the light incident side 301" of the second LGP 300" of the second light source module 100".

More specifically, in the embodiment shown in FIG. 1, the first light source module 100' includes a first turning film 200' and a first LGP 300'. The first turning film 200' is parallel to an XY plane. The first LGP 300' is arranged under the first turning film 200' and parallel to the XY plane. A light ray enters the first LGP from the light incident side 301', and exits the first LGP 300' from the light emergent surface 320', with more than 85% of light energy being concentrated between 70° and 90° with respect to a normal direction of the light emergent surface 320' (that is, a Z-axis direction in this embodiment), then enters the first turning film 200' and is steered right, and exits the first turning film 200' from a surface of the first turning film 200' away from the first LGP 300', with more than 80% of the light energy being concentrated between −30° and +30° with respect to left and right viewing angles relative to the Z-axis direction. Viewed from different angles, a first light ray 601 may enter the first LGP 300' in a Y-axis direction and then is transmitted, and exits the first LGP 300' from the light emergent surface 320' in a direction parallel to the Y-Z plane and by forming a first pointing angle $\theta_r'$ between the first light ray and the Z-axis direction, and then enters the first turning film 200' and exits the first turning film 200' from a surface 220' of the first turning film 200' away from the first LGP 300' along a first light emergent path 710. A first light emergent angle $\theta_s'$ is formed between the first light emergent path 710 and the Z-axis direction. An X-axis, a Y-axis, and a Z-axis are orthogonal. The switchable backlight module 800 further includes a plurality of first light-emitting elements 400' such as light-emitting diodes. For example, light-emitting diode strips may be formed and arranged on the light incident side 301' of the first LGP 300' to emit the first light ray 601. In different embodiments, the first light-emitting elements 400' may be elements with a light-emitting function other than light-emitting diodes, which are not limited to a plurality of first light-emitting elements.

Figure 1A:
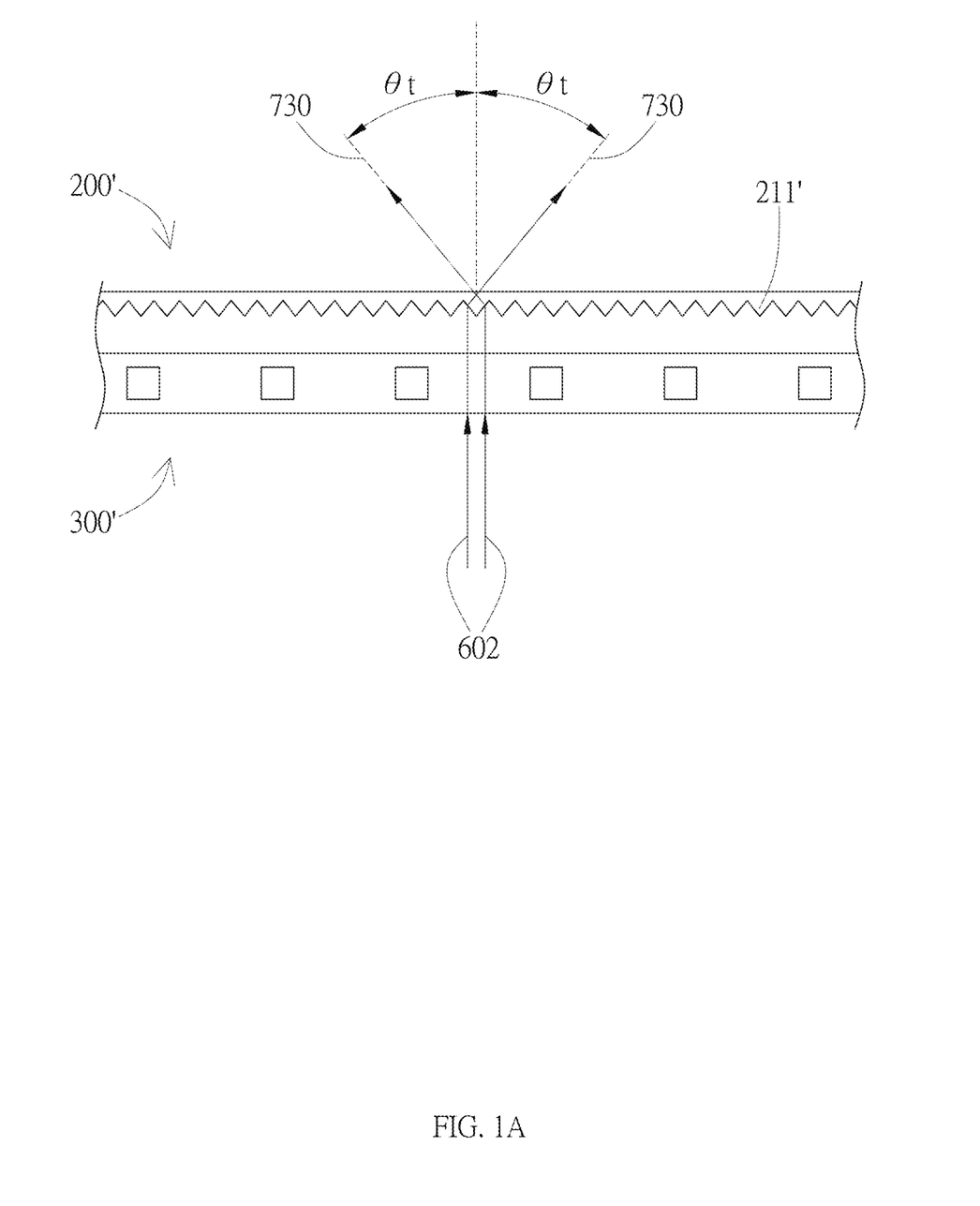
FIG. 1A is a schematic diagram of an embodiment in which a prism strip of a first turning film cuts a second light ray to a large viewing angle according to the present disclosure.
Figure 1B:
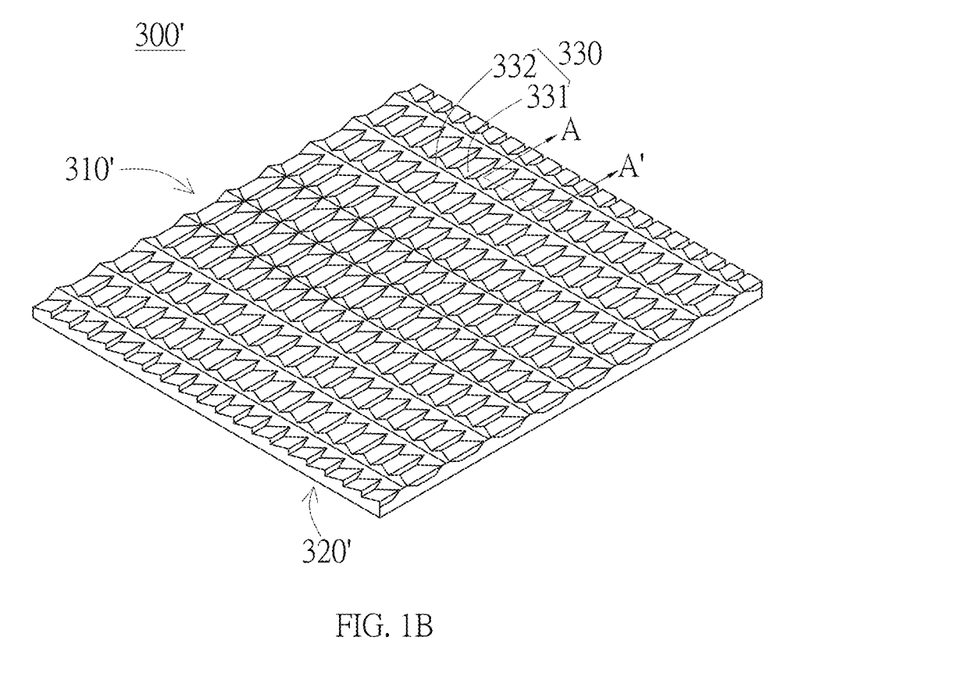
FIG. 1B and FIG. 1C are schematic diagrams of an embodiment of a microstructure in which a bottom surface of a first light guide plate (LGP) is provided with prisms and ribs according to the present disclosure.
Figure 1C:
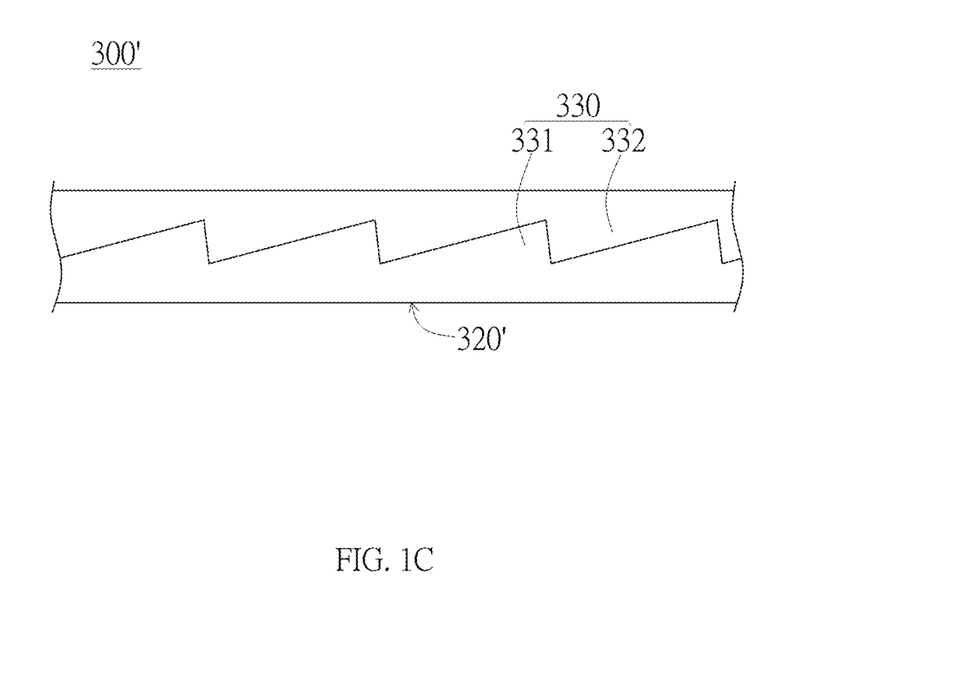
Figure 1D:
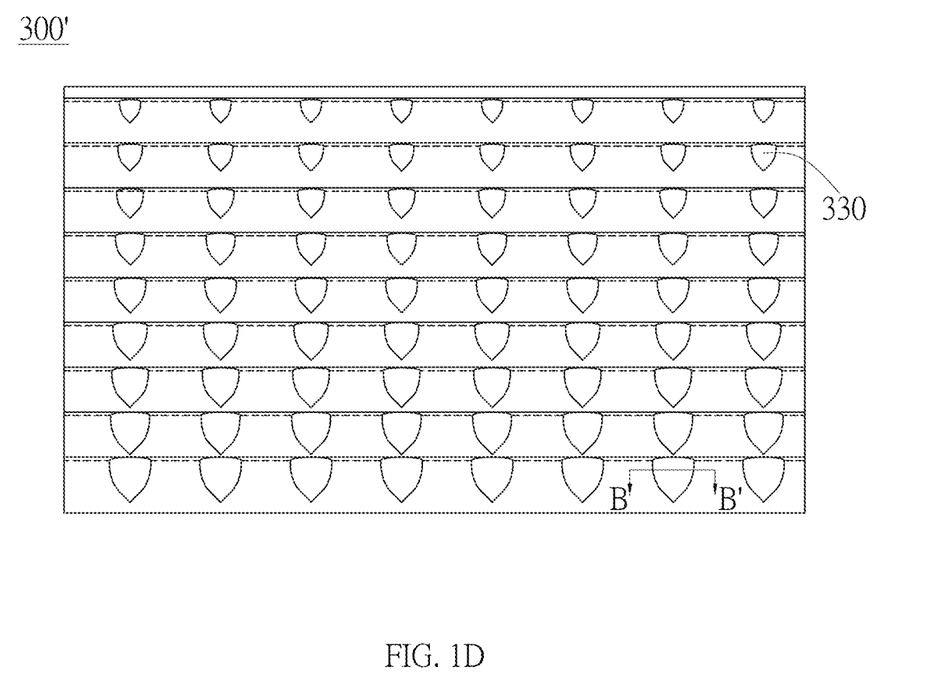
FIG. 1D and FIG. 1E are schematic diagrams of an embodiment of a microstructure in which a bottom surface of a first LGP is provided with curved protrusions according to the present disclosure.
Figure 1E:
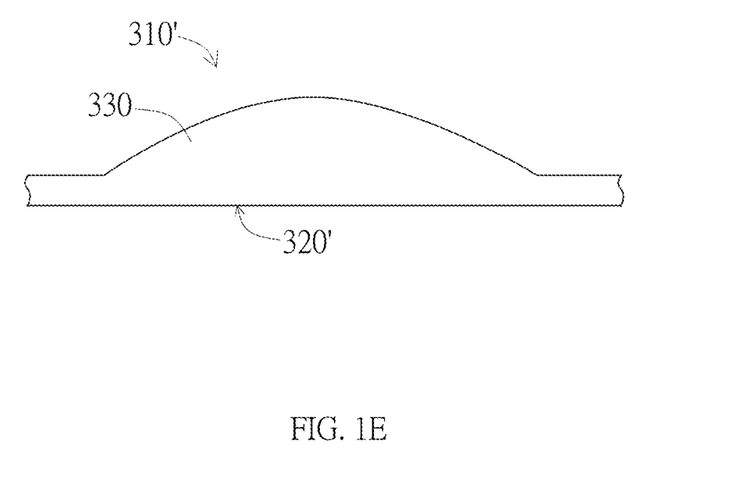

Further, the first LGP 300' is provided with a microstructure with respect to a bottom surface 310' of the light emergent surface 320', which can provide a considerable reflection effect for the first light ray 601 entering the first LGP from the light incident side 301' to change the traveling direction to destroy total reflection, so that the first light ray exits the first LGP 300' from the light emergent surface 320' toward the first turning film 200' in a direction parallel to the Y axis and by forming a first pointing angle $\theta_r'$ between the first light ray and the Z-axis direction. In other words, the microstructure has the effect of improving directivity of the light ray. The shape, size, and distribution of the microstructure may have different settings to improve the effect. For example, in the embodiments shown in FIG. 1B and FIG. 1C, FIG. 1C is a schematic cross-sectional view drawn taken along section line AA' in FIG. 1B. A microstructure 330 arranged on the bottom surface 310' may be a prism 331 and a rib 332, and the rib 332 connects two adjacent prisms 331 respectively. In another embodiment shown in FIG. 1D and FIG. 1E, FIG. 1E is a schematic cross-sectional view drawn taken along section line BB' in FIG. 1D. A microstructure 330 arranged on the bottom surface 310' may be a curved protrusion, that is, the microstructure 330 has a curved surface.

In an embodiment, the first pointing angle $\theta_r'$ of more than 85% of the light exiting the first LGP 300' from the light emergent surface 320' being between 70° and 90° means more than 85% of the light energy is concentrated between 70° and 90° with respect to the normal direction of the light emergent surface 320'. An optical structure of a surface 210' of the first turning film 200' facing the first LGP 300' including, for example, a plurality of prism strips 211' extend in a direction parallel to the light incident side 301' of the LGP 300', that is, extend in the X-axis direction. When the first light ray 601 exiting the first LGP 300' from the light emergent surface 320' enters the first turning film 200', the traveling direction of the first light ray is to changed again due to these optical structures, for example, more collimated, which means "steered right". Furthermore, the first light ray exits the first turning film 200' from the surface 220' along the first light emergent path 710, and the first light emergent angle $\theta_s'$ is formed between the first light emergent path 710 and the Z-axis direction. In an embodiment, the first light emergent angle $\theta_s'$ of more than 80% of the light exiting the first turning film 200' from the surface 220' being within 30° means more than 80% of the light energy is concentrated between −30° and +30° with respect to left and right viewing angles relative to the normal direction of the surface 220'. In addition, the first light emergent angle $\theta_s'$ of more than 50% of the light exiting the first turning film 200' from the surface 220' being within 10° means more than 50% of the light energy is concentrated between −10° and +10° with respect to the left and right viewing angles relative to the normal direction of the surface 220'. The first light emergent angle $\theta_s'$ is substantially the light emergent angle of the first light ray 601 on the switchable backlight module 800, and since the first light emergent angle is a narrow viewing angle within 30°, an anti-peeping effect can be achieved. Viewed from different perspectives, the first light source module 100' is a highly collimating system that emits light at an angle substantially perpendicular to the light emergent surface.

On the other hand, in the embodiment shown in FIG. 1, the second light source module 100' includes a second turning film 200' and a second LGP 300'. The second turning film 200" is parallel to an XY plane. The second LGP 300" is arranged under the second turning film 200" and parallel to the XY plane. A light ray enters the first LGP from the light incident side 301", and exits the second LGP 300" from the light emergent surface 320" with more than 85% of light energy being concentrated between 70° and 90° with respect to a normal direction of the light emergent surface 320" (that is, a Z-axis direction in this embodiment), then enters the second turning film 200" and is steered right, and exits the second turning film 200" from a surface of the second turning film 200" away from the second LGP 300", with more than 80% of the light energy being concentrated between −30° and +30° with respect to left and right viewing angles relative to the Z-axis direction. Viewed from different angles, a light ray 602 may enter the second LGP 300" in an X-axis direction and then is transmitted, and exits the second LGP 300" from the light emergent surface 320" in a direction parallel to the X-Z plane direction and by forming a second pointing angle $\theta_r''$ between the light ray and the Z-axis direction, and then enters the second turning film 200" and exits the second turning film 200" from a surface 220" of the second turning film 200" away from the second LGP 300" along a second light emergent path 720. A second light emergent angle $\theta_s''$ is formed between the second light emergent path 720 and the Z-axis direction (that is, the normal direction). The switchable backlight module 800 further includes a plurality of second light-emitting elements 400" such as light-emitting diodes. For example, light-emitting diode strips may be formed and arranged on the light incident side 301" of the second LGP 300" to emit the light ray 602. In different embodiments, the second light-emitting elements 400" may be elements with a light-emitting function other than light-emitting diodes, which are not limited to a plurality of second light-emitting elements.

Further, like the first LGP 300', the second LGP 300" is provided with a microstructure such as a prisms, a rib, and a curved protrusion with respect to a bottom surface 310" of the light emergent surface 320", which is capable of providing a considerable reflection effect for the light ray 602 entering the second LGP from the light incident side 301" to change the traveling direction to destroy total reflection, so that the light ray exits the second LGP 300" from the light emergent surface 320" toward the second turning film 200" in a direction parallel to the X axis and by forming a second pointing angle $\theta_r''$ between the light ray and the Z-axis direction. In an embodiment, the first pointing angle $\theta_r'$ of more than 85% of the light exiting the first LGP 300' from the light emergent surface 320' being between 70° and 90° means more than 85% of the light energy is concentrated between 70° and 90° with respect to the normal direction of the light emergent surface 320'. Like the first turning film 200', an optical structure of a surface 210" of the second turning film 200" facing the second LGP 300" including, for example, a plurality of prism strips 211" extend in a direction parallel to the light incident side 301" of the LGP 300", that is, extend in the Y-axis direction. When the light ray 602 exiting the second LGP 300" from the light emergent surface 320" enters the second turning film 200", the light is steered right due to these optical structures and exits the second turning film 200" from the surface 220" along the second light emergent path 720, and the second light emergent angle $\theta_s$" is formed between the second light emergent path 720 and the Z-axis direction. The second light emergent angle $\theta_s$" of more than 80% of the light exiting the second turning film 200" from the surface 220" being within 30° means more than 80% of the light energy is concentrated between −30° and +30° with respect to left and right viewing angles relative to the normal direction of the surface 220". In addition, the second light emergent angle $\theta_s$" of more than 50% of the light exiting the first turning film 200' from the surface 220" being within 10° means more than 50% of the light energy is concentrated between −10° and +10° with respect to the left and right viewing angles relative to the normal direction of the surface 220". Viewed from different perspectives, the second light source module 100" herein is a highly collimating system that emits light at an angle substantially perpendicular to the light emergent surface. Then, the emitted light ray 602 may pass up through the first LGP 300' as the second light ray 602' and then be emitted to the first turning film 200'. As shown in FIG. 1A, the prism strip 211' of the first turning film 200' may cut the second light ray 602' to a large viewing angle. That is to say, the second light ray exits from the first turning film 200' along a secondary light emergent path 730, and a secondary light emergent angle $\theta_t$ is formed between the secondary light emergent path 730 and the Z-axis direction. In an embodiment, the secondary light emergent angle $\theta_t$ is greater than 30°, that is, more than 80% of the light energy is distributed outside the range of −30 to +30 with respect to left and right viewing angles relative to the normal direction of the light emergent surface 320'. The secondary light emergent angle $\theta_t$ is substantially a light emergent angle of the second light ray 602' from the switchable backlight module 800. Compared with the narrow viewing angle of the first light emergent angle $\theta_s \propto$ within 30°, the viewing angle range of the second light ray 602' is larger.

Based on the above, when the switchable backlight module 800 is switched to only the first light-emitting element 400' that emits light, more than 80% of the light energy is concentrated between −30° and +30° with respect to the left and right viewing angles, and therefore the switchable backlight module generates the anti-peeping effect and is in the anti-peeping mode. On the other hand, when the switchable backlight module 800 is switched to the first light-emitting element 400' and the second light-emitting element 400' that both emit light, the light energy of the light ray emitted from the first light-emitting element 400' is between −30° and +30° with respect to the left and right viewing angles, and the light energy of the light ray emitted from the second light-emitting element 400" is distributed outside the range of −30° to +30° with respect to the left and right viewing angles. Therefore, a visible viewing angle range becomes larger, which substantially removes the anti-peeping effect, causing the switchable backlight module to be in a non-anti-peeping mode. In other words, the switchable backlight module 800 of the present disclosure may be switched to the anti-peeping mode or the non-anti-peeping mode by controlling switches of the first light-emitting element 400' and the second light-emitting element 400".

Figure 2:
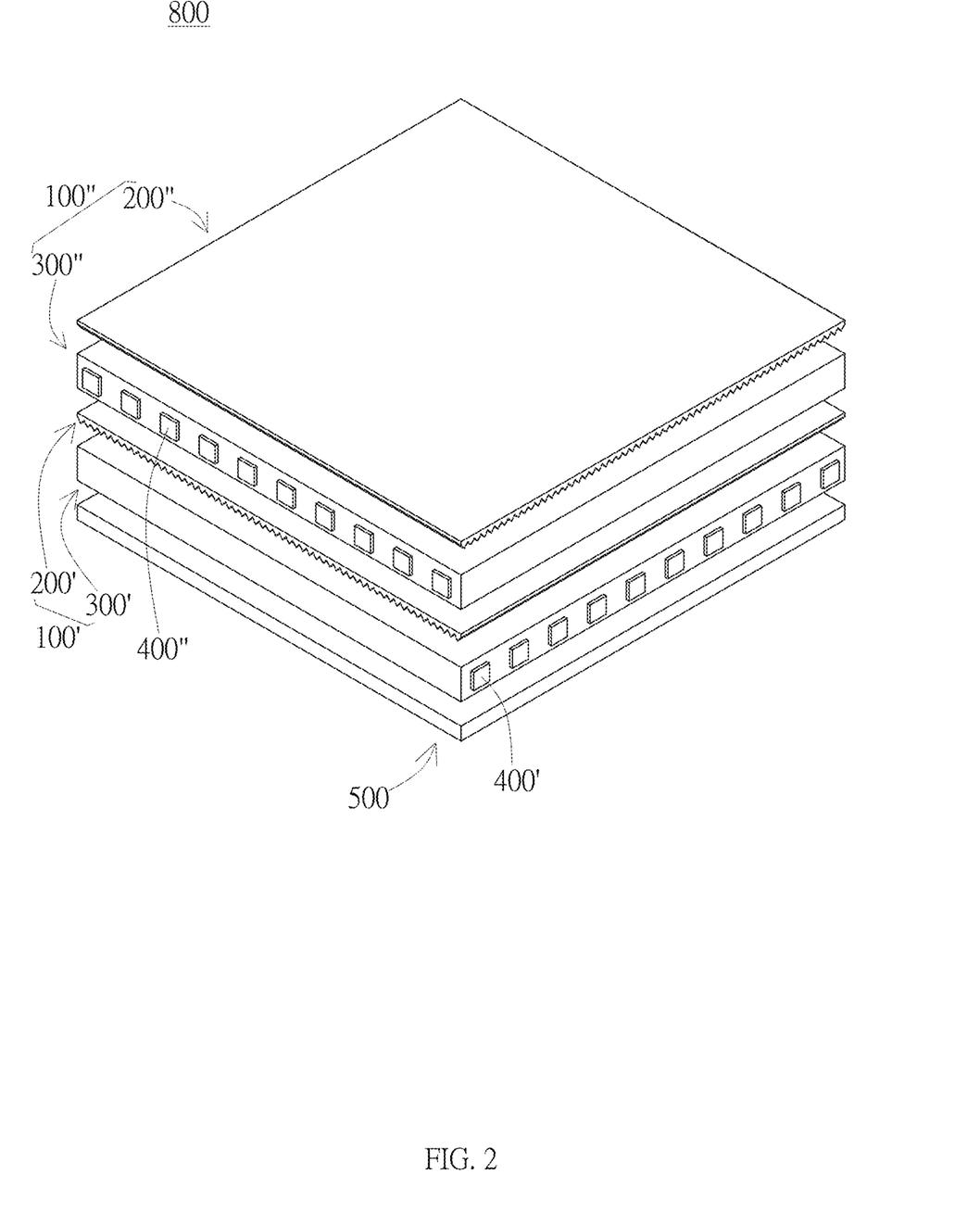
FIG. 2 is a schematic diagram of different embodiments of a switchable backlight module according to the present disclosure.

Viewed from different angles, the switchable backlight module 800 of the present disclosure includes two light source modules 100' and 100" arranged parallelly and rotate at 90° with respect to each other. For the upper first light source module 100', a traveling direction of a first light ray 601 emitted by the first light-emitting element 400' thereof is changed after passing through the first LGP 300' and the first turning film 200' to change, and is emitted at a narrow viewing angle. The light ray 602 emitted from the second light-emitting element 400" of the lower second light source module 100" is subjected to a first change in traveling direction by the second LGP 300" and the second turning film 200", is emitted from the surface 220" with a narrow viewing angle substantially perpendicular thereto, passes through the first LGP 300' straightly, is subjected to a second change in traveling direction when passing through the first turning film 200", and is finally emitted with a wide viewing angle. In other words, the lower light source module is a highly collimating system that emits light at an angle substantially perpendicular to the light emergent surface. Therefore, even if the first light source module 100' and the second light source module 100" are reversed up and down as shown in the embodiment of FIG. 2, the efficiency of the switchable backlight module 800 is not affected. Specifically, when the second light-emitting element 400" of the upper second light source module 100" is turned on, the light ray emitted by the second light-emitting element is emitted at a narrow viewing angle. In this case, the switchable backlight module 800 is in the anti-peeping mode. When the second light-emitting element 400" of the lower second light source module 100" is turned on, the light ray emitted by the second light-emitting element is emitted at a relatively wide viewing angle. In this case, the switchable backlight module 800 is in the non-anti-peeping mode.

In the foregoing embodiment, the first light source module 100' and the second light source module 100" only rotate at 90° with respect to each other, and are composed of same elements. Therefore, the first light emergent angle $\theta_s$' is the same as the second light emergent angle $\theta_s$", and the first pointing angle $\theta_r$' is the same as the second pointing angle $\theta_r$". However, in different embodiments, based on considerations such as design, manufacturing, use, the first light source module 100' and the second light source module 100" may be composed of different elements. Therefore, the first light emergent angle $\theta_s$' may be different from the second light emergent angle $\theta_s$", and the first pointing angle $\theta_r$' may be different from the second pointing angle $\theta_r$".

Figure 3:
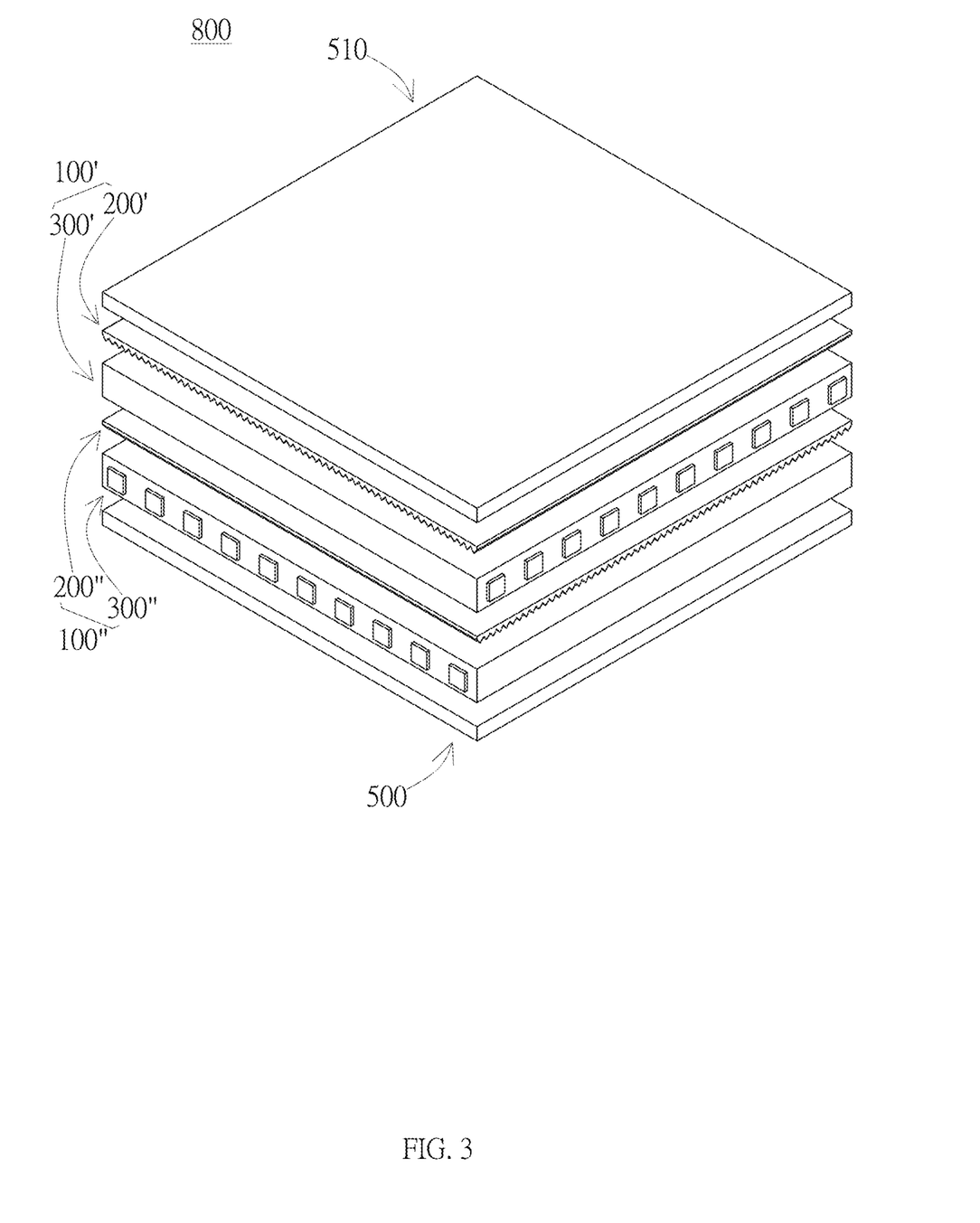
FIG. 3 to FIG. 5 are schematic diagrams of an embodiment in which a switchable backlight module according to the present disclosure includes a diffusion film.
Figure 4:
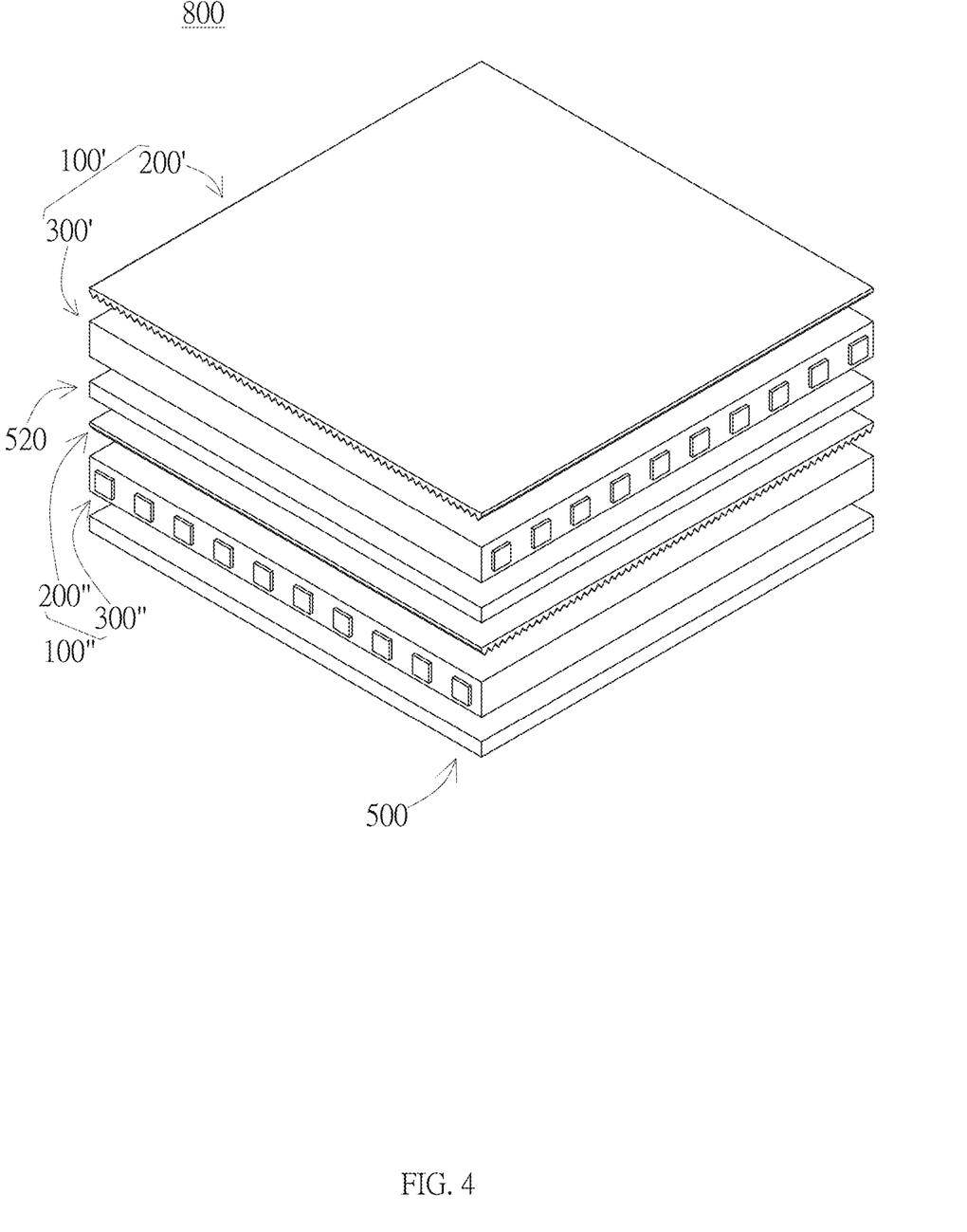
Figure 5:
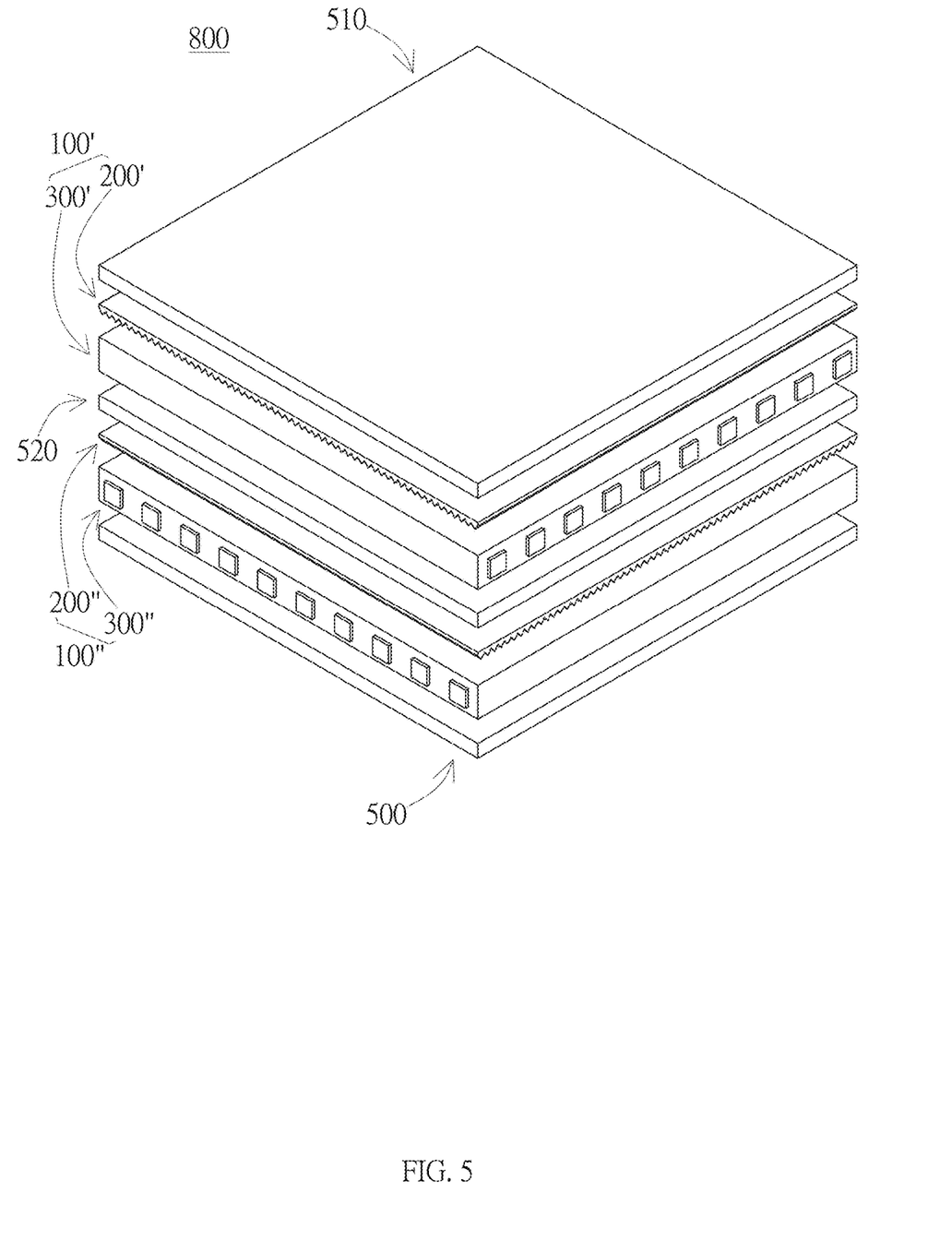

In the embodiments shown in FIG. 1 and FIG. 2, in order to improve use efficiency of light, the switchable backlight module 800 may include a reflective layer 500 arranged under the first light source module 100'. On the other hand, in the embodiments shown in FIG. 3 to FIG. 5, the switchable backlight module 800 may include a diffusion film. More specifically, in the embodiment shown in FIG. 3, the switchable backlight module 800 includes a first diffusion film 510 arranged over the first light source module 100'. In the embodiment shown in FIG. 4, the switchable backlight module 800 may include a second diffusion film 520 arranged between the first light source module 100' and the second light source module 100". In the embodiment shown in FIG. 5, the switchable backlight module 800 includes both the first diffusion film 510 arranged on the first light source module 100' and the second diffusion film 520 arranged between the first light source module 100' and the second light source module 100".

Figure 6:
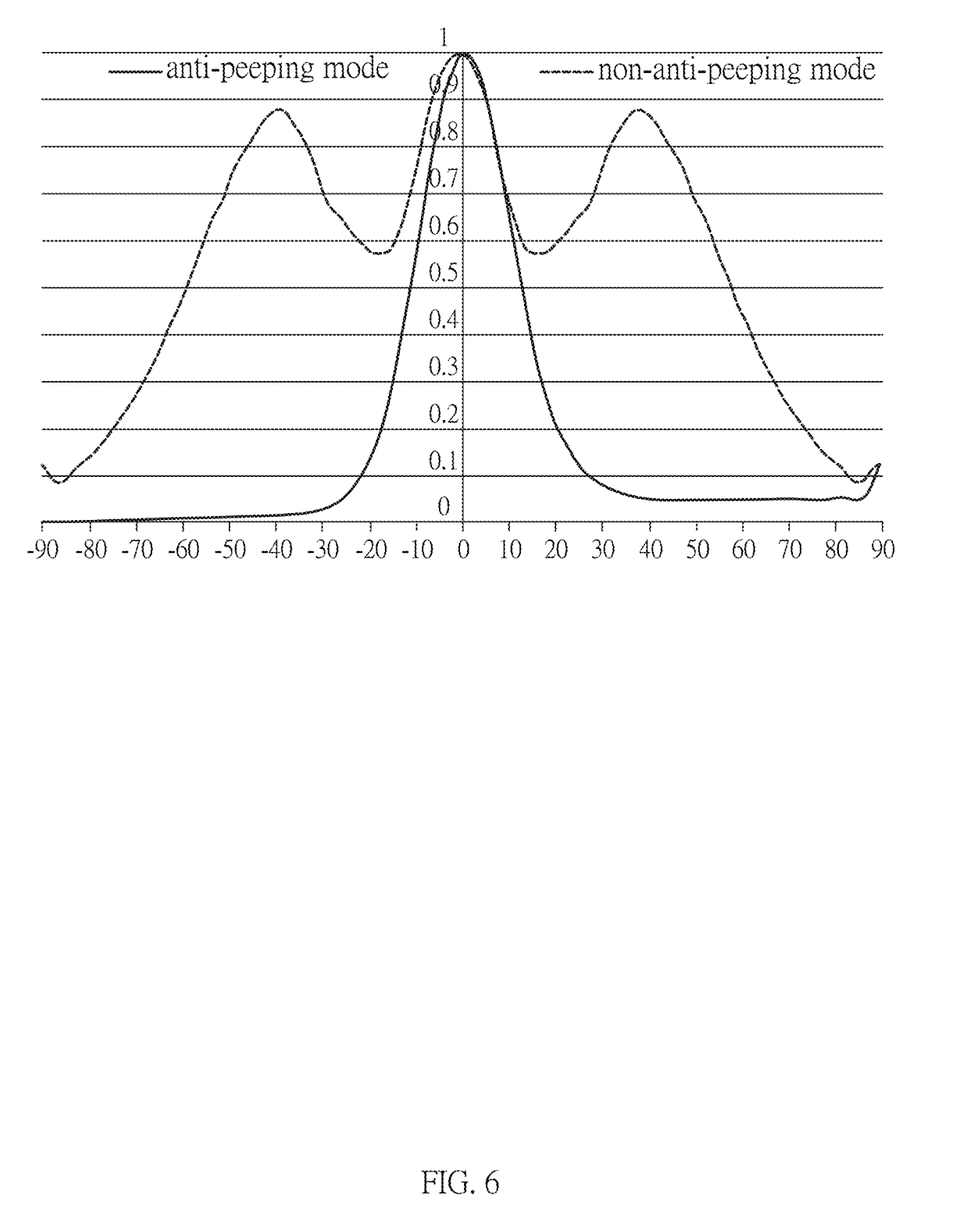
Figure 7A:
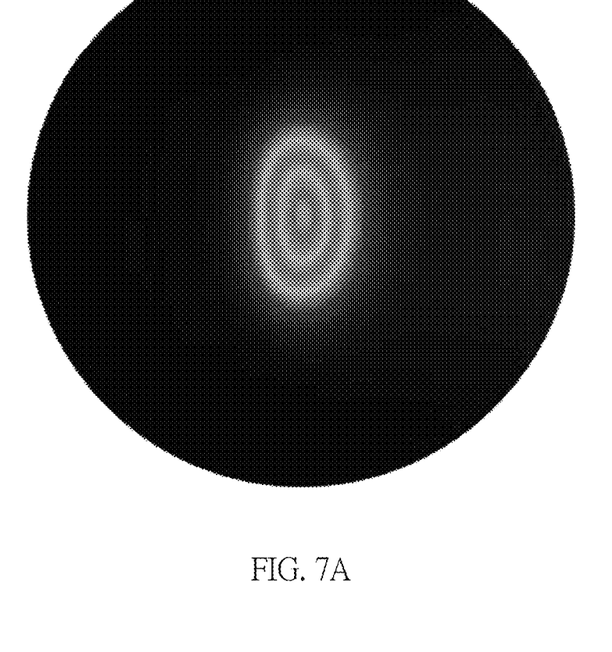
Figure 7B:
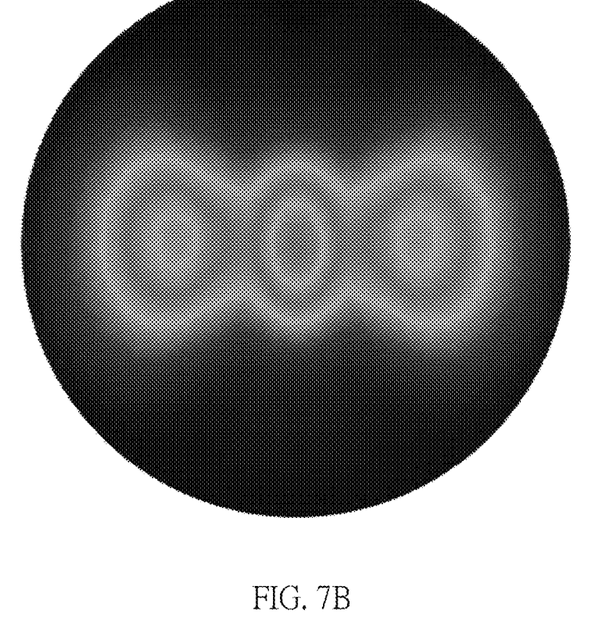

In the embodiment shown in FIG. 6, the X axis represents the angle, and the Y axis represents a normalized energy intensity. When the switchable backlight module 800 (see FIG. 1) is in the anti-peeping mode, that is, only the first light-emitting element 400' is turned on, a light shape is roughly distributed in the viewing angle of 30°. Specifically, more than 80% of the light energy is concentrated between −30° and +30° with respect to the left and right viewing angles. Accordingly, it can be seen in FIG. 7A that the light emission range is concentrated in the central part, and it can be seen from this that the switchable backlight module has a good anti-peeping effect. On the contrary, when the switchable backlight module is in the non-anti-peeping mode, that is, the second light-emitting element 400" is also turned on, a distribution region of the light shape extends to a viewing angle of about 70°. Specifically, the light energy is also distributed outside the range of −30° to +30° with respect to the left and right viewing angles. Accordingly, it can be seen from FIG. 7B that the light-emitting range further includes regions on two sides of the central part besides the central part. Accordingly, the switchable backlight module 800 of the present disclosure is capable of being effectively switched to the anti-peeping mode or the non-anti-peeping mode.

On the other hand, as shown in Table 1, compare with the prior art, the switchable backlight module of the present disclosure is switched to the anti-peeping mode and the non-anti-peeping mode by controlling the switch of the light-emitting element. Therefore, when the same brightness is achieved, energy consumption of the anti-peeping mode and the non-anti-peeping mode is only 30% and 50% of energy consumption of the prior art respectively, which indicates that the switchable backlight module has lower energy consumption. In addition, the stacking thickness and material costs are only 87% and 65% of the prior art respectively, which has better economy. As a comparison, both the prior art and the present disclosure are a 72 ea LED having 8 lm, 20 mA, and a power of 4.32 W. Further specifications and performance are shown in Table 2 below.

TABLE 1

|  | Prior art | Switchable backlight module of the present disclosure |
|---|---|---|
| Energy consumption in the anti-peeping mode | 100% | 30% |
| Energy consumption in the non-anti-peeping mode | 100% | 50% |
| Stacking thickness | 100% | 83% |
| Material cost | 100% | 65% |

TABLE 2

|  | Prior art | Switchable backlight module of the present disclosure |
|---|---|---|
| Energy consumption in the anti-peeping mode | Brightness: 9000 nit, with a small viewing angle | Brightness: 30000 nit, with a small viewing angle |
| Energy consumption in the non-anti-peeping mode | Brightness: 9000 nit, with a large viewing angle | Brightness: 18000 nit, with a large viewing angle |
| Film and LGP Stacking thickness | Thickness of silver reflector: 0.1 mm<br>Thickness of lower LGP: 0.55 mm<br>Lower diffuser: 0.056 mm<br>Lower prism sheet: 0.125 mm<br>Upper prism sheet: 0.125 mm<br>Anti-peeping sheet 1: 0.325 mm<br>Thickness of upper LGP: 0.55 mm<br>Total thickness: 1.831 mm | Thickness of silver reflector: 0.1 mm<br>Thickness of lower LGP: 0.55 mm<br>Lower prism sheet: 0.16 mm<br>Thickness of upper LGP: 0.55 mm<br>Upper prism sheet: 0.16 mm<br>Total thickness: 1.52 mm |
| Film and LGP Material cost | 30 dollars | 19.5 dollars |

The present disclosure is described by means of the above-described relevant embodiments. However, the above-described embodiments are only examples for implementing the present disclosure. It should be pointed out that the disclosed embodiments do not limit the scope of the present disclosure. In contrast, the spirit included in the scope of the patent application and modifications and equivalent settings made within the scope are all included in the scope of the present disclosure.

What is claimed is:

1. A switchable backlight module, comprising:
   two light source modules, arranged in such a way that at least parts of projections overlap, wherein each of the light source modules comprises:
   a turning film; and
   a light guide plate (LGP), arranged parallelly under the turning film and having a light emergent surface facing the turning film and a light incident side at a side of the light emergent surface, wherein a light-emitting element arranged on the light incident side emits a light ray, the light ray enters the LGP from the light incident side and exits the LGP from the light emergent surface, with more than 85% of light energy being concentrated between 70° and 90° with respect to a normal direction of the light emergent surface, then enters the turning film and is steered right, and exits the turning film from a surface of the turning film away from the LGP, with more than 80% of the light energy being concentrated between −30° and +30° with respect to left and right viewing angles relative to the normal direction of the light emergent surface, and the light incident side of the LGP of one of the light source modules is perpendicular to the light incident side of the LGP of the other light source module, wherein the switchable backlight module is in an anti-peeping mode having a narrow viewing angle when only an upper one of the light source modules emits light and the switchable backlight module is in a non-anti-peeping mode having a wide viewing angle when both of the two light source modules emit light, wherein the viewing angle of the light ray emitted by the upper one of the light source modules is more narrow than the viewing angle of the light ray emitted by the lower one of the light source modules;

wherein a plurality of prism strips extending in a direction parallel to the light incident side of the LGP are arranged on a surface of the turning film;

wherein the prism strips of the turning film of one of the light source modules are perpendicular to the prism strips of the turning film of the other of the light source modules;

wherein more than 50% of the light energy after the light ray is steered right is concentrated between −10° and +10° with respect to the left and right viewing angles relative to the normal direction of the light emergent surface.

2. The switchable backlight module according to claim 1, further comprising a first diffusion film arranged over the light source modules.

3. The switchable backlight module according to claim 1, wherein after a light ray exiting the lower light source module passes through the upper light source module, more than 80% of the light energy is distributed outside the range of −30° to +30° with respect to the left and right viewing angles relative to the normal direction of the light emergent surface.

4. The switchable backlight module according to claim 1, further comprising a second diffusion film arranged between the light source modules.

5. The switchable backlight module according to claim 1, wherein a plurality of microstructures are provided on a surface of the LGP away from the light emergent surface, the light ray entering the LGP from the light incident side of the LGP travels in a changed direction through the microstructures and exits the LGP from the light emergent surface, with more than 85% of the light energy being concentrated between 70° and 90° with respect to the normal direction of the light emergent surface.

6. The switchable backlight module according to claim 1, wherein a light emergent angle of one of the light source modules is the same as a light emergent angle of the other light source module.

7. The switchable backlight module according to claim 1, wherein a light emergent angle of one of the light source modules is different from a light emergent angle of the other light source module.

8. The switchable backlight module according to claim 1, further comprising a reflective layer arranged under the light source modules.

* * * * *